Nov. 8, 1949     H. G. EASTMAN     2,487,533
MIXER FOR DRY AND WET INGREDIENTS
Filed Feb. 25, 1946     2 Sheets-Sheet 1
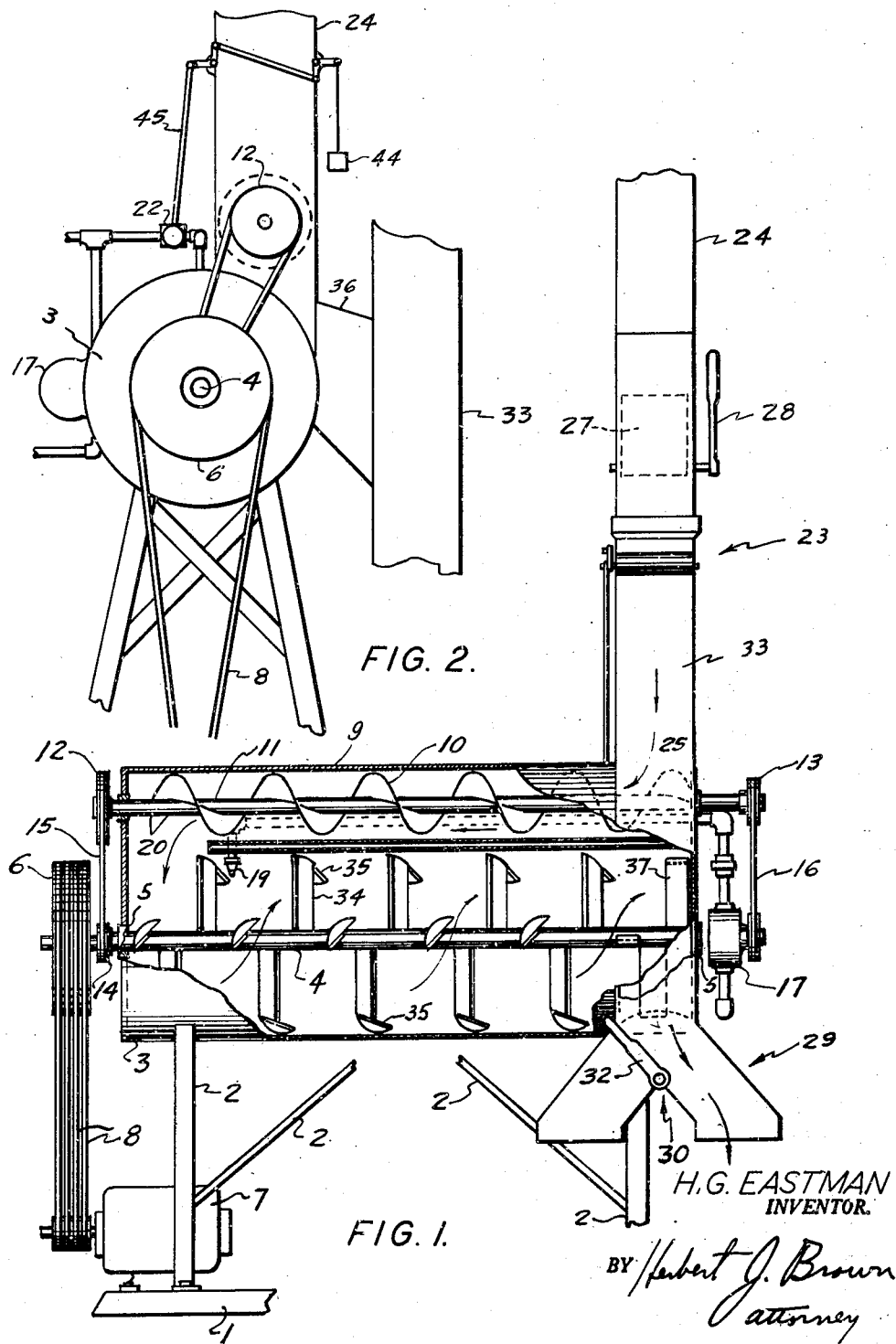

Nov. 8, 1949  H. G. EASTMAN  2,487,533
MIXER FOR DRY AND WET INGREDIENTS
Filed Feb. 25, 1946  2 Sheets-Sheet 2

H. G. EASTMAN
INVENTOR.

BY Herbert J. Brown
attorney

Patented Nov. 8, 1949

2,487,533

UNITED STATES PATENT OFFICE 2,487,533

MIXER FOR DRY AND WET INGREDIENTS

Harold G. Eastman, Arlington, Tex., assignor of one-half to Roland Turck, Arlington, and one-half to Stewart W. De Vore, Tarrant County, Tex.

Application February 25, 1946, Serial No. 650,081

3 Claims. (Cl. 259—9)

This invention relates to mixing machines and has particular reference to a machine for mixing quantities of dry ingredients with wet ingredients.

An object of the invention is to provide a mixer of the described class which has but a single automatic control.

Another object of the invention is to provide a mixer capable of regulating and controlling the percentages of wet ingredients to dry ingredients.

A further object of the invention is to provide, in a mixer of the described class, apparatus and construction whereby the interior parts of the machine will not become clogged even though wet ingredients of high viscosity are used.

A further object of the invention is to provide a mixing machine capable of mixing large quantities of wet and dry ingredients with relatively low horsepower.

A further object of the invention is to provide a mixing machine of the described class wherein the mass within the mixing chamber is thoroughly acted upon.

A still further object of the invention is to provide a mixing machine for wet and dry ingredients which is capable of readily unloading the mixed mass.

These and other objects will become apparent from the following description of the accompanying drawings, wherein:

Figure 1 is a side elevational view, shown in broken section, of the new mixing machine.

Figure 2 is a broken left end elevational view of the mixing machine shown in Figure 1.

Figures 3, 4, 5:
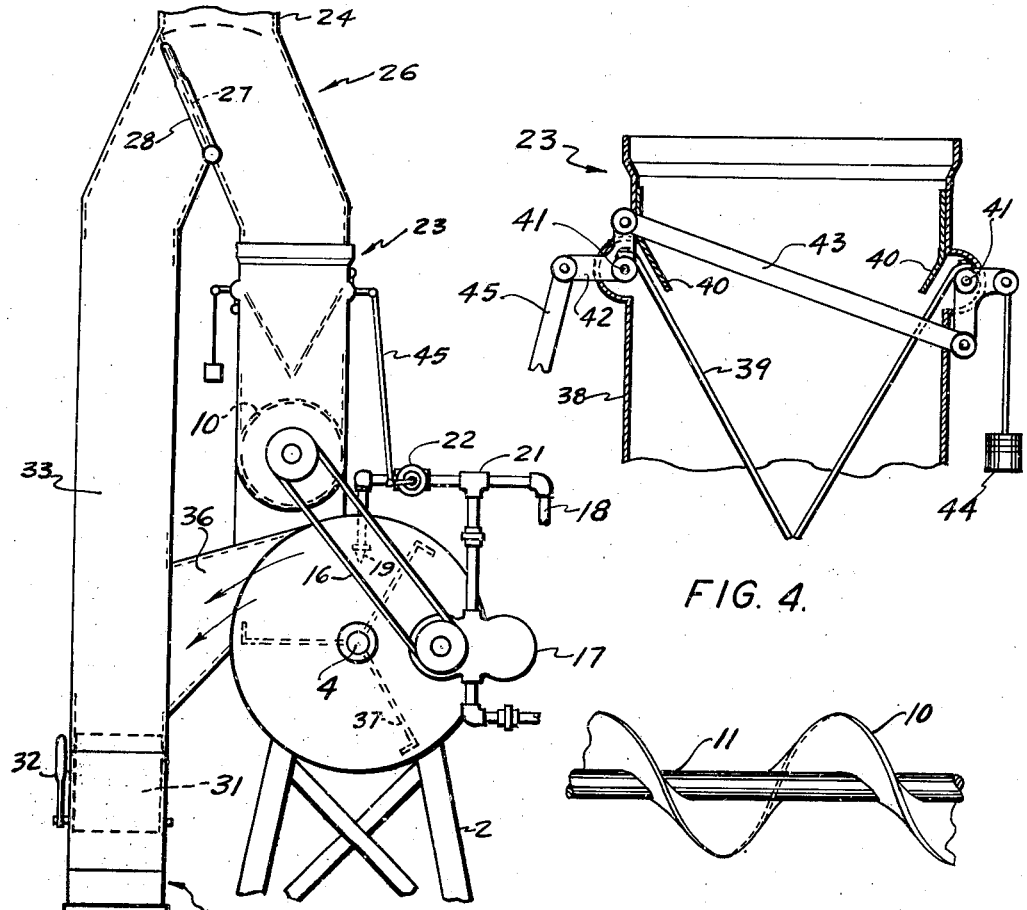
Figure 3 is a broken elevational view of the right end of the mixing machine shown in Figure 1.
Figure 4 is a vertical sectional view, with certain parts in elevation, of the regulator of the new mixing machine.
Figure 5 is a broken side elevational view of a helical conveyor used in the conveyor assembly of the new mixing machine, and, Figure 6 is a perspective view of a portion of the mixing chamber shaft and showing the arrangement of blades and knives thereon.
Figure 6:
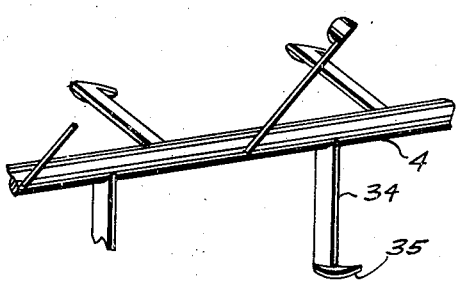

Accordingly, the invention includes a base 1 and a frame work 2 mounted thereon. A cylindrical mixing chamber 3 is mounted at the upper end of the frame 2 and has a mixing chamber shaft 4 journaled therethrough, said shaft being mounted in bearings 5 at each end of the said chamber. As shown in Figures 1, 2 and 3, the mixing shaft 4 is positioned for rotation within the axial center of the cylindrical mixing chamber 3. The shaft 4 is driven by any suitable arrangement such as a pulley 6 mounted on the said shaft outside of the chamber 3, and driven by a motor 7 connected by belts 8.

Above the chamber 3 and parallel therewith, there is a conveyer 10 mounted for rotation housing 9. The conveyer shaft 11 extends beyond the closed ends of the housing 9 where pulleys, 12 and 13, respectively, are mounted. The first referred to pulley 12 is driven by another pulley 14 mounted on the mixing chamber shaft 4 outside of the chamber 3, and is operatively connected therewith by means of a belt 15. The last referred to arrangement of pulleys and belt is for rotating and operating the helical conveyer 10.

The pulley 13 at the other end of the conveyer shaft 11 is connected by means of a belt 16 to a fluid pump 17. The latter (17) is connected with pipes 18, one line of which extends to a nozzle 19 positioned within the upper end of the chamber 3 and near the discharge end of the conveyer 10. An opening 20 is provided between the discharge end of the conveyer housing 9, and the inlet end of the mixing chamber 3.

As particularly shown in Figure 3, the lines 18 are provided with a T 21 for returning excess wet ingredients to storage. Before reaching the nozzle 19 the wet ingredients pass through a valve mechanism 22 which is operated and controlled by the regulator assembly 23 illustrated in Figure 4.

Dry ingredients are received, by gravity, through an inlet spout 24 mounted above the inlet 25 of the conveyer housing 9. Before reaching the inlet 25 the spout 24 is branched, as at 26 in Figure 3, in order to bypass the mixing machine when desired. The branch 26 is provided with a deflector plate 27 which is operated by an external lever 28. The sacker 29 is branched as at 30, thus allowing one sack (not shown) to be positioned for receiving mixed material while another sack is being attached. Direction of flow at the sacker 29 is controlled by another deflector plate 31 similarly operated by an external lever 32. The bypass portion of the inlet spout 24 connecting with the sack 29 is indicated by the numeral 33.

Referring now to Figure 1 and the interior of the mixing chamber 3, the shaft 4 is provided with a series of spaced angularly and radially disposed impeller blades 34 along the same. Knives 35 are attached to the ends of the blades 34 and are preferably disposed toward and extend beyond the trailing edges of the said blades. As particularly shown in Figure 1, the blades 34 are positioned below the chamber opening 20 and extend to an unloading chute 36. It will be noted that the latter (36) is downwardly inclined and communicates the unloading end of the mixing chamber 3 with the bypass chute 33. Preferably, the unloading chute 36 is connected with the upper portion of the mixing chamber and tangentially therewith. Unloading paddles 37 are mounted on the mixing chamber shaft 4 at the discharge end of the chamber 3 for lifting the mixed mass into the discharge chute 36 from where it enters the sacker 29. As shown in Figure 1, the faces of the paddles 37 are parallel with the length of the shaft 4.

Referring now to Figures 2 and 4, and particularly to the regulator 23, the latter is comprised of a housing 38 of sheet metal or the like, and has horizontally pivoted regulating gates 39 mounted therein, which gates are inwardly and downwardly disposed, and when closed are in contact with each other along their lower edges. Within the housing 38 there are inwardly and opposingly arranged baffles 40 which are downwardly inclined so as to protect parallel shafts 41 therebeneath on which the gates 39 are mounted. Outwardly of the housing 38 and secured to the gate shafts 41, bell cranks 42 are mounted for operating the gates 39. As particularly shown in Figure 4, the leg of one bell crank 41 is upwardly disposed, whereas the corresponding leg of the other bell crank 41 is downwardly disposed. The referred to legs are pivotally connected by means of a link 43, and by this arrangement the gates 39 are mechanically connected so as to cause each to have equal, but opposite, angular movement when in operation. The outwardly extending leg of one of the bell cranks 41 is provided with a counterweight 44, whereas the corresponding leg of the other bell crank 41 is provided with a linking arm 45 which in turn is connected with the previously referred to liquid supply valve 22.

In operation, dry ingredients are supplied by gravity through the chute 24, and through the regulator 23. The ingredients are then propelled by the conveyer 10 to the mixing chamber 3.

The amount of dry ingredients passing through the regulator 23 opens the gates 39 accordingly, and by reason of the described construction, the wet ingredient valve 22 is opened to allow the wet ingredients to enter the mixing chamber through the nozzle 19. By this arrangement a controlled percentage of dry ingredients to wet ingredients is provided. By changing the leverage of the regulator 23, or the control of the valve 22, the proportion of wet to dry ingredients may be changed.

The helical conveyer 10 forces the dry ingredient to the mixing chamber 3 through the opening 20 therebetween and whereafter the nozzle 19 sprays the wet ingredients upon the dry. By reason of the angular disposition of the blades 34 the wet mass is moved toward the discharge chute 36 of the chamber 3. Preferably the blades 34 are so spaced that the mass between blades is acted upon at its center by the operation of each successive blade. Where the wet ingredient has a high viscosity, a tendency of the mixed and partially mixed mass is to adhere to the walls of the chamber 3. By reason of the action of the described knife blades 35 such adhered masses are removed from the wall of the chamber 3 without clogging or balling up before each blade 34 since the said knives are disposed from the training edge rather than the leading edge of the said blades. When the mass acted upon reaches the lifting paddles, the mixed mass is then raised by the same into the unloading chute 36, from where it moves by gravity to the sacker 30.

What I claim is:

1. A mixing machine comprising in combination, a horizontal mixing chamber, a driven impeller within the said chamber, a housing above the said chamber, a driven conveyor within the said housing, an opening between the said housing and the said chamber near one end of the latter, an inlet in the upper surface of the said housing opposite the said chamber opening, a vertical chute above and opening into the said housing inlet, a gate pivotally supported within the said vertical chute, a nozzle within the said chamber and near the said chamber opening, a pipe connected with the said nozzle, a valve connected with the said pipe for regulating the said nozzle, a bell crank secured to the said gate, a linking arm connecting the said bell crank with the said valve, and an outlet in the said chamber remote from the said chamber opening.

2. A mixing machine comprising in combination: a horizontal mixing chamber, a housing above the said chamber, a driven conveyor within the said housing, an opening between the said housing and the said chamber near one end of the latter, an inlet in the upper surface of the said housing opposite the said chamber opening, a vertical chute above and opening into the said housing inlet, a pivotally supported gate within the said vertical chute, a nozzle within the said chamber near the said chamber opening, a pipe connected with the said nozzle, a valve connected with the said pipe for regulating the said nozzle, an outlet in the said chamber remote from the said chamber opening, a bell crank secured to the said gate, a linking arm connecting the said bell crank with the said valve, and lifting paddles carried by the said impeller and located opposite the said chamber outlet.

3. A mixing machine comprising in combination: a horizontal mixing chamber, a driven impeller within the said chamber, a housing above the said chamber, a driven conveyor within the said housing, an opening between the said housing and the said chamber near one end of the latter, an inlet in the upper surface of the said housing opposite the said chamber opening, a vertical chute above and opening into the said housing inlet, a gate pivotally supported within the said vertical chute, a nozzle within the said chamber and near the said chamber opening, a pipe connected with the said nozzle, a valve connected with the said pipe for regulating the said nozzle, a bell crank secured to the said gate, a linking arm connecting the said bell crank with the said valve, an outlet in the said chamber remote from the said chamber opening, a bypass in the said chute above the said gate, and an outlet chute connecting the said outlet with the said bypass.

HAROLD G. EASTMAN.

REFERENCES CITED

The following references are of record in the file of this patent:

UNITED STATES PATENTS

| Number | Name | Date |
| --- | --- | --- |
| 299,370 | Fletcher | May 27, 1884 |
| 881,135 | Kirk | Mar. 10, 1908 |
| 1,852,712 | Field | Apr. 5, 1932 |
| 1,866,030 | Green | July 5, 1932 |
| 2,164,257 | Riza | June 27, 1939 |
| 2,237,787 | Marshall | Apr. 8, 1941 |